United States Patent [19]
Puthuff et al.

[11] Patent Number: 5,877,752
[45] Date of Patent: Mar. 2, 1999

[54] COMPUTER LIGHT PEN INTERFACE SYSTEM

[75] Inventors: Neil C. Puthuff, Aliso Viejo; James D. Bearden, Lake Forest, both of Calif.

[73] Assignee: Interactive Computer Products, Inc., Irvine, Calif.

[21] Appl. No.: 865,746

[22] Filed: May 30, 1997

[51] Int. Cl.[6] .................................................. G09G 1/00
[52] U.S. Cl. ........................................ 345/180; 345/181
[58] Field of Search .................................. 345/180, 181, 345/182, 183, 173, 178, 179

[56] References Cited

U.S. PATENT DOCUMENTS

| | | | |
|---|---|---|---|
| 3,594,608 | 7/1971 | Mutton | 345/181 |
| 3,906,197 | 9/1975 | Grover | 345/180 |
| 4,011,546 | 3/1977 | Kawata et al. | 345/180 |
| 4,642,459 | 2/1987 | Caswell et al. | 345/180 |
| 5,691,749 | 11/1997 | Sugiyama | 345/181 |

*Primary Examiner*—Matthew Luu
*Attorney, Agent, or Firm*—Harold L. Jackson

[57] ABSTRACT

A light pen computer interface system utilizes a coil located externally of the computer's CRT display monitor to sense the magnetic field which provides the raster for the CRT. Vertical and horizontal sync detection circuits receive the sensor coil output and supply vertical and horizontal sync signals to a timing circuit. The timing circuit in response to an output signal from the light pen and the vertical and horizontal sync signals supplies a pen position signal to the computer which is either representative of the x,y coordinates position of the light pen on the CRT screen or representative of the change of x,y coordinates between successive positions of the light pen.

18 Claims, 5 Drawing Sheets

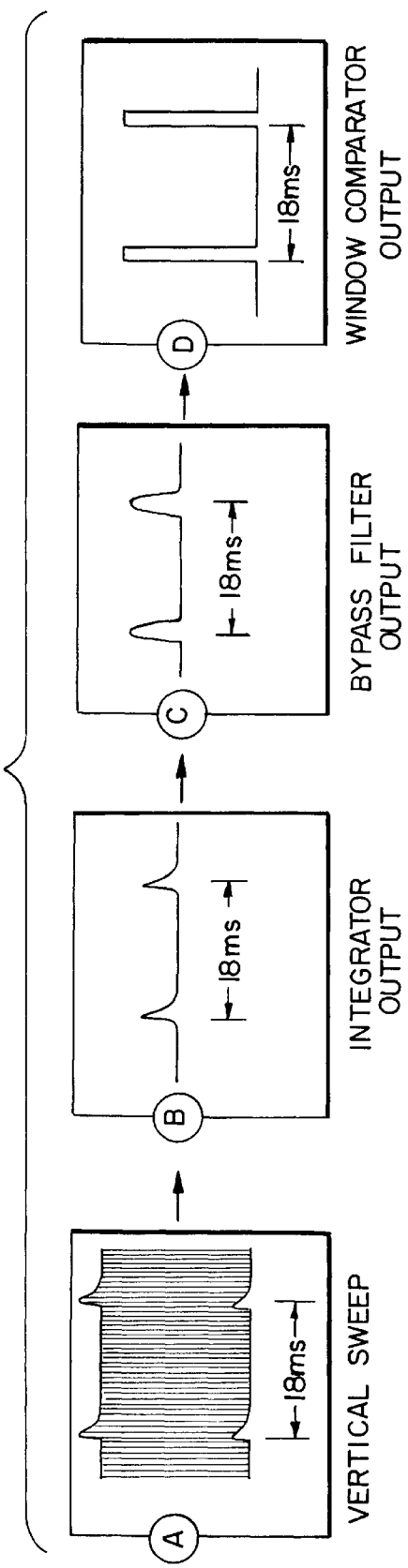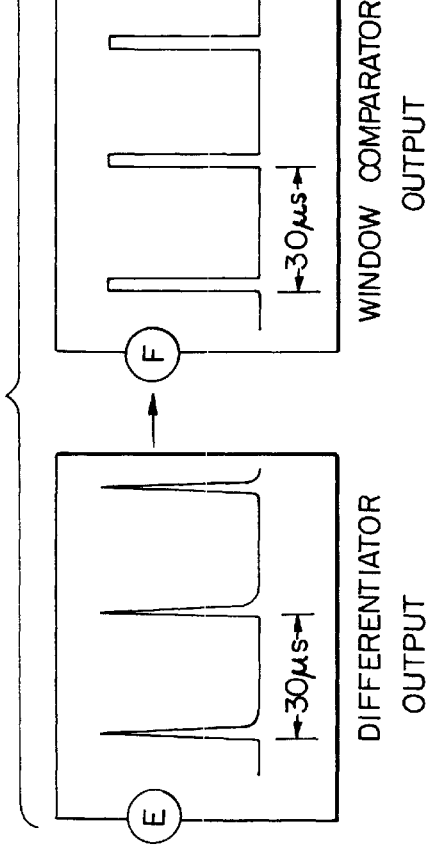

COMPUTER LIGHT PEN INTERFACE SYSTEM

BACKGROUND OF THE INVENTION

1. Field of the Invention

This invention relates to a low power light pen interface unit which correlates signals from a light pen with a position on a cathode ray tube video monitor used in conjunction with a computer.

2. Description of the Prior Art

Information is provided to a computer in a number of ways. One way of providing information is by direct input from a user. The most common user interface for inputting information is the keyboard. The keyboard requires the user to type information in the same manner as a typist with a typewriter. However, this is not the only was a user can provide information.

Another method of providing information to the computer relies upon the relative position of a cursor to a location on a video display such as a cathode ray tube (CRT). This can be accomplished by use of a mouse, light pen or other conventional devices. A mouse is a device that rests on a pad next to the computer and generally includes a ball which responds to the movement of the mouse by the user's hand in an x-y plane. This motion is translated onto the CRT by way of a cursor which points to a specific location. When positioned correctly, the user may use a button, or buttons, on the mouse to direct the computer to perform an action dictated by the cursor's location. That action can take many forms. Three such options are; 1) to issue a command to perform some function, or; 2) request information, or; 3) select from a menu of available options.

A light pen is similar in appearance to a pen or pencil-type writing instrument. It differs from the mouse in that the tip of the light pen when placed in close proximity with the surface of the CRT receives light signals, via a photo detector, emanating from the illumination of the phosphorous coating as the electron gun within the CRT scans the pixels on the internal surface of the CRT. Light pens interact directly with the video monitor's screen like a touchscreen, in providing the absolute positioning and pen-type input of a digitizing tablet, but do not suffer from the confusion and ambiguity of a relative positioning mouse. For most operating systems light pens are used as pointing devices with the same basic functional characteristics (to the operating system) as a mouse. Special device driver software supplied by the light pen manufacturer provides the light pen with these characteristics. The light pen is typically provided with a button, or buttons, that allow the user to execute a number of options in a manner similar to the buttons on a mouse.

Light pens are preferred over a mouse by many users. One reason for this is that the light pen does not require a pad and thus occupies less space on a desk. Another reason is that the use of a light pen for drawing is more comfortable as it is closely aligned with the method by which most people learn to draw. That is, with a pen, pencil, or brush.

Prior art light pen systems have suffered from a number of disadvantages. To determine the position of a light pen on the face of a CRT video monitor it is necessary to synchronize the receipt of the signal with the video synchronization ("sync") signals i.e. the horizontal and vertical sync signals of the CRT raster. In the prior art systems it was necessary to make physical interconnection with the video sync circuitry inside of the monitor in order to obtain the necessary sync signals. Such an interconnection required time and some expertise.

In addition to the physical video sync circuitry interconnection, prior art light pens required an external power source to supply the power utilized by the digital timing circuitry needed for the precise timing measurements between the light pen signal and the CRT's sync signals. Typically a high frequency oscillator (to provide the necessary precision) and a counter was used for such measurements. However, such high frequency digital circuitry required considerable power e.g. of the order of 400+ milliwatts for the horizontal measurement alone. This high power requirement, as a practical matter, ruled out the use of the computer power supply as the source, thereby requiring an external power supply. In addition to the high power requirements the prior art all digital timing circuitry utilizing a fixed frequency oscillator, suffered from decreasing resolution as the CRT scanning frequency increased to provide a higher resolution. Such a fixed frequency approach provides less time to accumulate counts with an increased horizontal scanning frequency.

In addition to the above shortcomings of prior art light pens the market for such is target specific. For example, if the target marketplace is PC-compatible computers running Microsoft Windows 95 as an operating system, then the manufacturer must develop not only a compatible interface for the light pen, but also develop device driver software to support the interface and make it functional within that operating system. This approach has the following disadvantages for the Lightpen Manufacturer:

(a) It requires the manufacturer's software developer to have detailed knowledge of the inner workings of each of the target operating systems;

(b) It is prone to bugs and incompatibilities that generally aren't discovered through in-house testing. The manufacturer, as a practical matter, cannot possibly recreate all of the system configuration combinations that are in use in the marketplace and;

(c) It is subject to problems caused by periodic changes to the operating system made by it's producer.

This development effort must be repeated by the manufacturer for each target operating system and computer type, a costly and time-consuming process.

There is a need for a light pen interface system which overcomes the above shortcomings of the prior art.

SUMMARY OF THE INVENTION

A system for providing an interface between a light pen and a computer in which a CRT serves as the monitor or video display in accordance with the present invention, includes a magnetic field sensor coil adapted to be positioned adjacent the monitor. The sensor coil senses the magnetic field which provides the CRT raster and produces an output signal representative thereof. Vertical and horizontal sync detection circuits receive the sensor coil output and produce vertical and horizontal sync signals representative of the initiation of each vertical and horizontal sweep signal, respectively. The sensor coil which may be mounted on the video monitor housing eliminates the need to interconnect the light pen with the CRT's internal sweep signal circuitry.

A timing circuit, responsive to an output signal from the light pen and the horizontal sync signal provides a horizontal timing signal representative of the time interval between the occurrence of the light pen signal and the horizontal sync signal. Preferably the timing circuit utilizes an analog ramp voltage generator in which the output voltage varies linearly from a preset value such as zero volts to a maximum value.

The ramp generator consumes little power thereby enabling the interface system to draw its power from the computer power supply, if desired, thereby eliminating the need for an external power supply. In addition the slope of the ramp is preferably adjustable to allow an operator to maximize the counts, i.e. digital representation of the value of the ramp generator output voltage which coincides with the signal from the light pen.

The timing circuit preferably includes a microcontroller which in response to the light pen signal, the horizontal and vertical sync signals and the horizontal timing signal, produces a light pen position signal representative of the position of the light pen on the CRT screen. The light pen signal may be of the conventional type which represents the x,y coordinates of the light pen position. Preferably, however, the light pen position signal is representative of changes in the x,y coordinates between successive positions of the light pen, thereby emulating the operation of a mouse, digitizing tablet or touchscreen. Thus the light pen system output can be connected to the mouse port on the host computer, thereby eliminating the need to develop custom driver software to support the lightpen for different types of host computers and operating systems.

The light pen interface system may be connected to the host computer via a conventional R232 connector.

The features and operation of the present invention may best be understood by the following description taken in conjunction with the accompanying drawings in which like components are designated by the same reference numeral.

BRIEF DESCRIPTION OF THE DRAWINGS

FIGS. 2–4 are waveform diagrams showing the waveforms present at the output of the several components shown in FIG. 1;

DESCRIPTION OF THE PREFERRED EMBODIMENT

Figure 1:
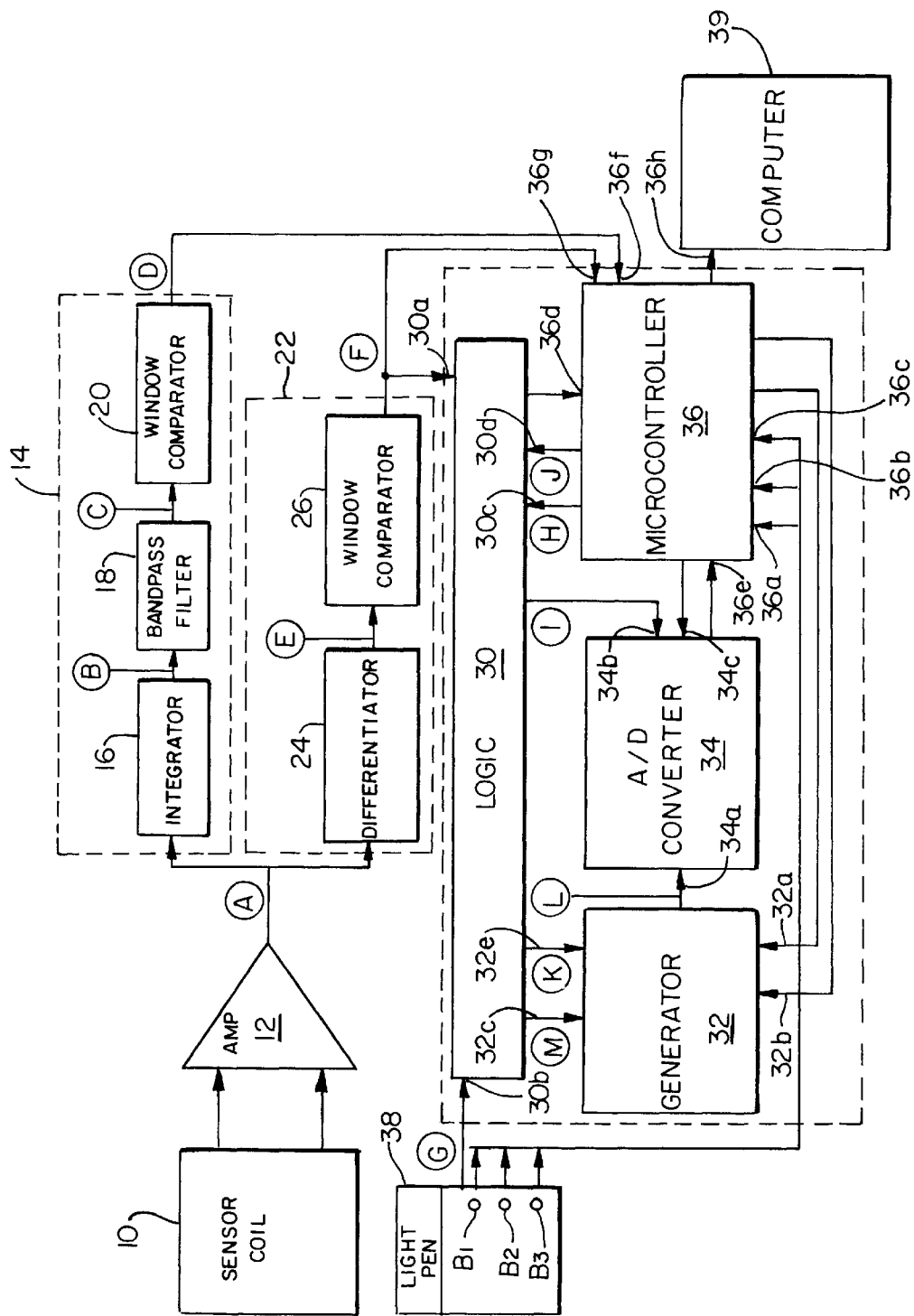
FIG. 1 is a block diagram of a preferred embodiment of the present invention.
Figure 4:
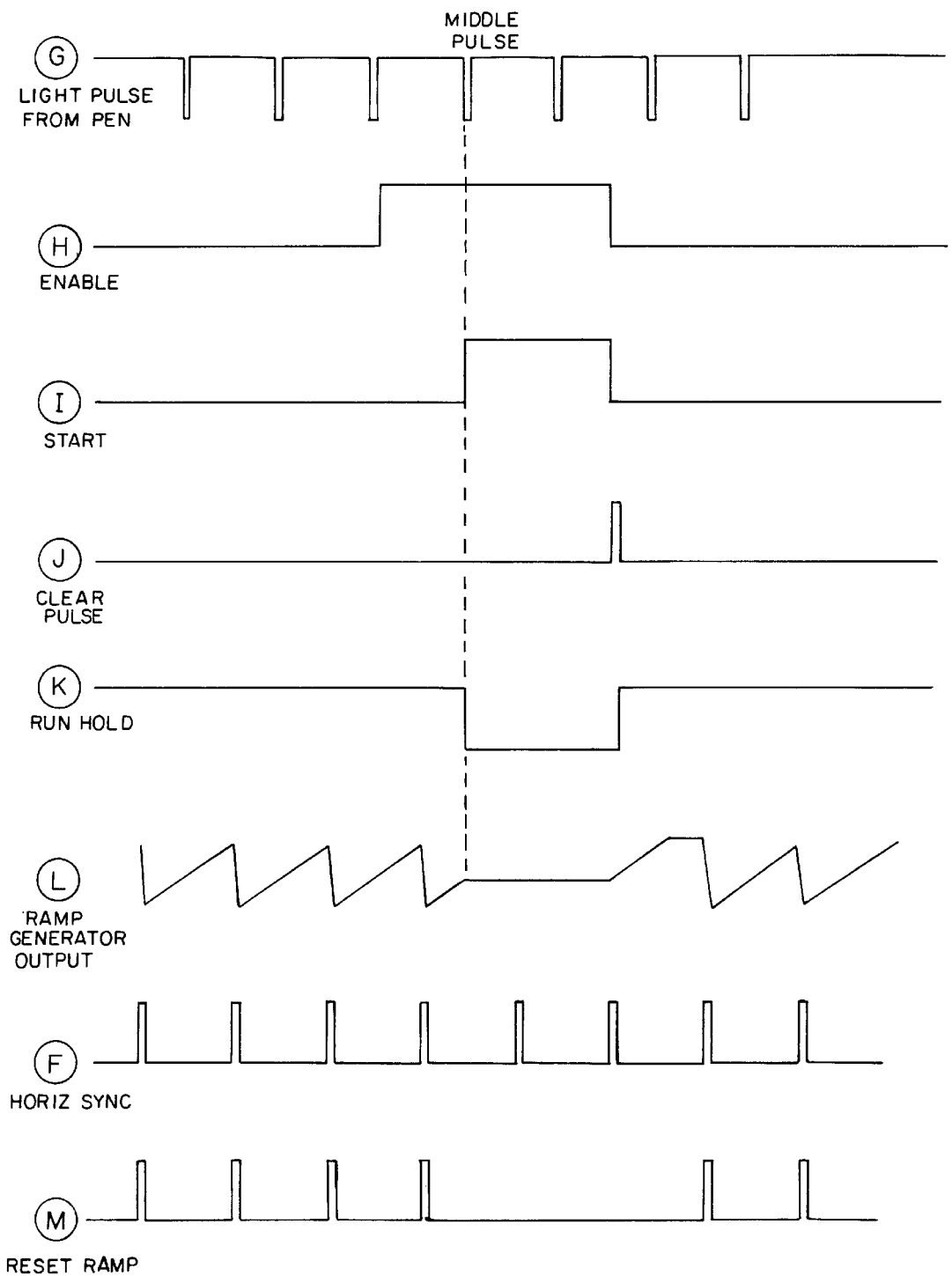

Referring now to FIGS. 1–4 a magnetic sensing coil 10 is arranged to detect the electromagnetic fields generated by the sweep signals of a video monitor (CRT) display (not shown) to provide a raster scan for the CRT. The magnetic coil may be mounted externally from the CRT, but in a proximity whereby the magnetic coil can detect the electromagnetic fields impressed on the CRT electron beam. The output of the magnetic coil 10 is amplified by a high gain amplifier 12. The output waveform of the amplifier is shown at A in FIG. 2 and is in the form of a composite signal representing the CRT horizontal and vertical sweep signals.

A vertical sync circuit 14 (shown in dashed lines in FIG. 1) processes the output signal from the amplifier 12 to provide a vertical sync signal which represents the initiation of the vertical sweep of the CRT.

The vertical sync circuit 14 is composed of an integrator 16, a bandpass filter 18, and a window comparator 20. Referring to FIG. 2, the waveforms of the output signals from the integrator, bandpass filter, and window comparator are illustrated at B, C & D. The bandpass filter allows only a specific range of frequencies to pass. As a result, the output signal C from the bandpass filter is without an exponential decay as is exhibited in the integrator output B.

The window comparator squares up the output signal from the bandpass filter to provide a periodic square wave output signal having a specific height and width that coincides with the initiation of the CRT vertical sweep signal. Typically the time between vertical sweep signals is 18 m as is illustrated by waveforms B,C & D.

A horizontal sync circuit 22 is also coupled to the sensor coil 10. The horizontal sync circuit processes the composite amplifier output signal A (FIG. 2) and provides an output signal which precisely represents the initiation of the horizontal sweep signal for the CRT.

The horizontal sync circuit 22 is composed of a differentiator 24 and a window comparator 26. The waveform of the differentiator output signal is shown at E in FIG. 3. The window comparator 26 squares up the differentiator output potential and provides a square wave output signal shown at F in FIG. 3 which represents the initiation of the CRT horizontal sweep. Typically the time between horizontal sweep signals is 30 $\mu$s as is illustrated in waveforms E & F.

The vertical sync and horizontal sync signals D and F, respectively, are received by a timing circuit 28. The timing circuit is composed of a logic circuit 30, a variable rate analog ramp generator 32, an analog to digital (A/D) converter 34 and a microcontroller 36.

The ramp generator 32 provides an analog voltage in the form of a ramp which is applied to an input 34a of the A/D converter 34. The ramp voltage increases from an initial value, such as zero volts, to a maximum value at a variable rate, which rate is set by signals supplied to 1st and 2nd range inputs 32a & 32b from the microcontroller as will be explained in more detail. The ramp is initiated by the horizontal sync signal received on logic circuit input 30a (in the absence of a ramp voltage hold signal to be explained) and transferred to ramp generator reset input 32c as shown. The waveform of the ramp generator output is shown at K in FIG. 4. The waveform of the ramp reset signal is shown at M in FIG. 4.

A light pen 38, which may be of the RJ12 type, includes three range control buttons designated $B_1$, $B_2$, and $B_3$. The buttons are connected to the microcontroller range inputs 36a, 36b and 36c as illustrated and control the signals applied to the ramp generator inputs 32a and 32b. The range control signals control the slope of the ramp voltage from the generator as will be explained in more detail in connection with FIG. 5.

The light pen output signal applied to input 30b of the logic circuit is in the form of a series of discrete pulses resulting from the successive illumination of the several pixels underlying the photo detector (not shown) on the end of the pen. The light pen signal is transferred by the logic to input 36d of the microcontroller which counts the number of such pulses and provides a light pen enable capture signal on logic circuit input 30c. The enable capture signal is initiated at approximately the occurrence of the center pulse from the train of pulses received from the light pen and terminates after a preset time sufficient to allow the A/D converter to convert the value of the ramp voltage to a digital signal. In response to this signal, the logic circuit generates a ramp voltage capture signal, shown, at I in FIG. 4, which is initiated by the occurrence of the enable capture signal H and the next pulse (of the train of pulses) from the light pen as will be explained in more detail in connection with FIG. 5.

The ramp voltage capture signal I (FIG. 4) is supplied by the logic circuit to input 34b of the D/A converter along with a clock signal on input 34c from the microcontroller 36. The ramp generator output voltage, which coincides with the center (or approximate center) output pulse from the light pen, is maintained for the short time duration required by the A/D converter 34 to sample the voltage and generate a digital signal representative of the value thereof. A run/hold signal shown at K in FIG. 4 and supplied on input 32e serves to hold the ramp voltage constant during the conversion process. It should be noted that the ramp generator will not be reset by the horizontal sync signal during the presence of the hold signal K.

The A/D converter output is supplied to input 36e of the microcontroller 36. Upon receipt of the output from the A/D converter the microcontroller sends a clear light pen pulse signal shown at J in FIG. 4, to input 30d of logic circuit 30 which in turn terminates the hold signal K on ramp generator input 32e thereby permitting the next horizontal sync signal to reset the ramp generator.

The microcontroller includes a counter (not shown) which is reset by the vertical sync signal on input 36f. The counter is advanced by each horizontal sync signal on input 36g, thereby enabling the microcontroller to determine the horizontal scan line which coincides with the light pen output signal. This scan line determines the Y position of the light pen while the level of the output voltage from the ramp generator determines the x position. This data, in the form of the x,y coordinate position, is supplied on output 36h to a host computer 39 via a conventional light pen interface driver or via a novel mouse, trackball or keyboard interface logic to be described which translates the light pen position signal into a signal which is representative of the change of the x,y coordinates between successive positions of the light pen.

Figure 5:
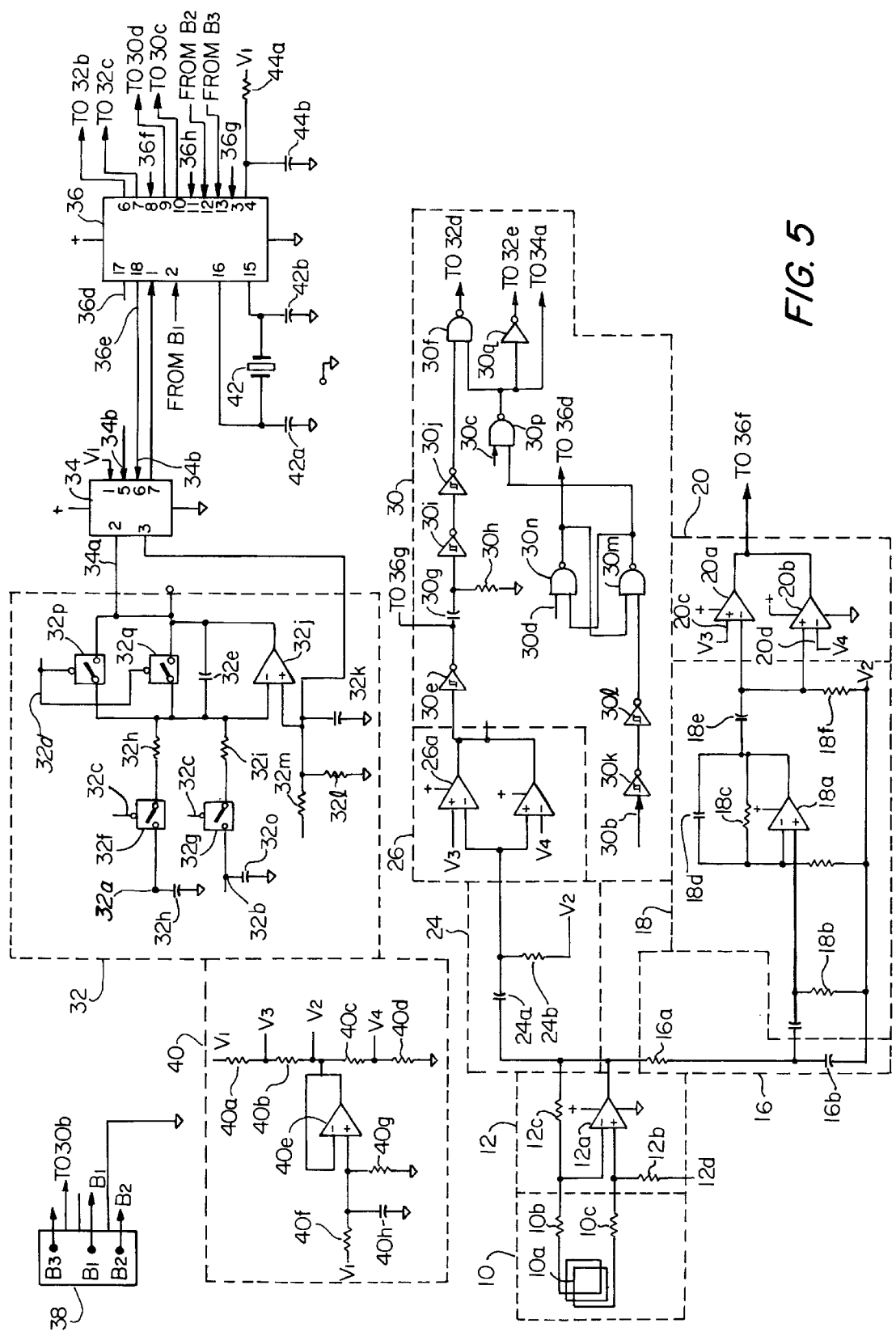
FIG. 5 is a schematic circuit diagram of circuit components which may be utilized in the blocks of FIG. 1.

Discrete components for incorporation into the blocks of FIG. 2 are shown by way of example only in FIG. 5.

Referring now to FIG. 5, the sensor coil circuitry 10 includes winding 10a and resistors 10b and 10c as shown. The output of the coil is supplied to the high gain amplifier which includes an operational amplifier ("op amp") 12a and resistors 12b and 12c as shown. A bias voltage V2 from a regulated supply 40, to be explained, is supplied to the amplifier via resistor 12b.

The integrator 16, forming part of the vertical sync circuit 14, comprises resistor 16a and capacitor 16b. The band pass filter 18 includes an op amp 18a, and filter and signal coupling elements, i.e., resistors 18b, 18c, capacitor 18d, capacitor 18e and a resistor 18f. The vertical sync window comparator 20 includes op amps 20a and 20b. Upper and lower threshold bias voltage V3 and V4, supplied by the regulated supply 40, are applied to the terminals 20c and 20d, respectively, as shown. These threshold bias voltages determine the range of voltage levels, e.g., between about +2 v to +4 v, (assuming that the operating voltage for the system is +5 v, for example) to which the vertical sync window comparator will respond. The output of the op amps 20a and 20b is the vertical sync signal which is applied to microcontroller input 36f. The microcontroller may be of the type distributed under model No. DIC 1654. The pin numbers of the microcontroller are designated on the drawing. It should be noted that other computing units may be used in the circuitry as will be readily known to those skilled in the art.

The regulated supply 40 which provides the upper and lower threshold values for the vertical and horizontal sync window comparators includes a resistor string 40a,b,c and d connected between the supply voltage $V_1$, e.g., +5 v, and ground. An op amp 40e, along with it's associated resistors 40f and 40g and capacitor 40h accurately maintains the desired voltage V2, V3 and V4.

The composite sweep signal from the amplifier 12 is also applied to the horizontal sync signal differentiator 24 which comprises a capacitor 24a and a resistor 24b. The horizontal sync window comparator comprises op amps 26a and 26b, which like the op amps 20a and 20b, receive upper and lower bias voltage V3 and V4, respectively. The horizontal sync signal from the window comparator 26 is applied to the input of a schmidt trigger inverter 30e which forms part of the logic circuit 30. The output from the inverter 30e is supplied to microcontroller 36g and also to one input of a NAND gate 30f; via capacitor 30g, resistor 30h and inverters 30i and 30j, as shown. The output signal from light pen 38, in the form of the series of pulses, is supplied on logic circuit input 30b to inverters 30k and 30l, as shown with the output thereof being applied to one input of a NAND gate 30m.

The light pulse clear signal J (FIG. 4) from the microcontroller 36 is applied to an input of a companion NAND gate 30n. The output from the gate 30n, comprising the train of squared up output pulses from the light pen, is supplied to the input line 36d of the microcontroller as shown. As pointed out previously, the microcontroller counts the individual pulses and in response to the occurrence of a middle pulse generates the enable capture signal H which is supplied to one input of a NAND gate 30p. The other input to this gate receives the output from the NAND gate 30m. The output of the gate 30p is the ramp voltage capture signal I which is supplied to (1) the input 34b of the A/D converter 34, (2) the hold/run input 32e of the ramp generator 32 via an inverter 30q and (3) the other input of the NAND gate 30f. The output of the gate 30f is the ramp generator reset signal M which coincides with the first horizontal sync signal following the termination of the hold signal K. The ramp reset signal is supplied to input 32d of the ramp generator 32.

The ramp generator 32 includes an integrating capacitor 32e which is charged by the voltage, e.g., +5 volts, applied to one or both range control inputs 32a and 32b from the microcontroller, via solid state switches 32f, 32g and resistors 32h and 32i, op amp 32j (functioning as an active integrating element) and associated capacitor 32k and resistors 32l and 32m, as shown. The resistors 32h and 32i have different values so that the capacitor 32e will charge at different rates depending upon whether voltage is applied to terminal 32a or 32b or both terminals by the microcontroller. As an example, using a 5 volt supply on inputs 32a and 32b, the capacitor 32e may have a value of 100 pf and the resistors 32h and 32I may have values of 100 Ω and 21.5Ω, respectively. Obviously such values are a matter of an engineering determination to obtain the desired slope values for the three ranges. The smaller the resistance value in series with the supply voltage the greater the slope of the ramp voltage. Three slope ranges are available, one slope with current flow only through resistor 32b, another slope with current flow through only resistor 32e and a third slope with current flow through both resistors. Filter capacitors 32n and 32o are connected between the inputs 32a and 32b and ground as shown. Solid state integrator reset switches 32p and 32q are connected in parallel with the integrating capacitor 32e. These switches are closed in response to reset signal M (FIG. 4) to remove the charge across the capacitor 32e. The ramp voltage is supplied to input 34a of the D/A converter.

A crystal 42 (along with capacitors 42a and 42b) is connected to the microcontroller 36 to provide the clock frequency. The microcontroller, which may be the commercially available part No. P1C16C54 receives the power supply voltage $V_1$ via filter resistor 44*a* and capacitor 44*b*.

The output data from the microcontroller 36 may be of the conventional x,y coordinate data which functions with the host computer operating system to which it is supplied via compatible driven software as is well known to those skilled in the art. Alternatively, the microcontroller may be programmed as illustrated in FIG. 6 to provide x,y data representing the pen position in a manner which emulates the position of a cursor as controlled by a mouse/trackball or a keyboard or a digitizing table or a touchscreen.

Figure 6:
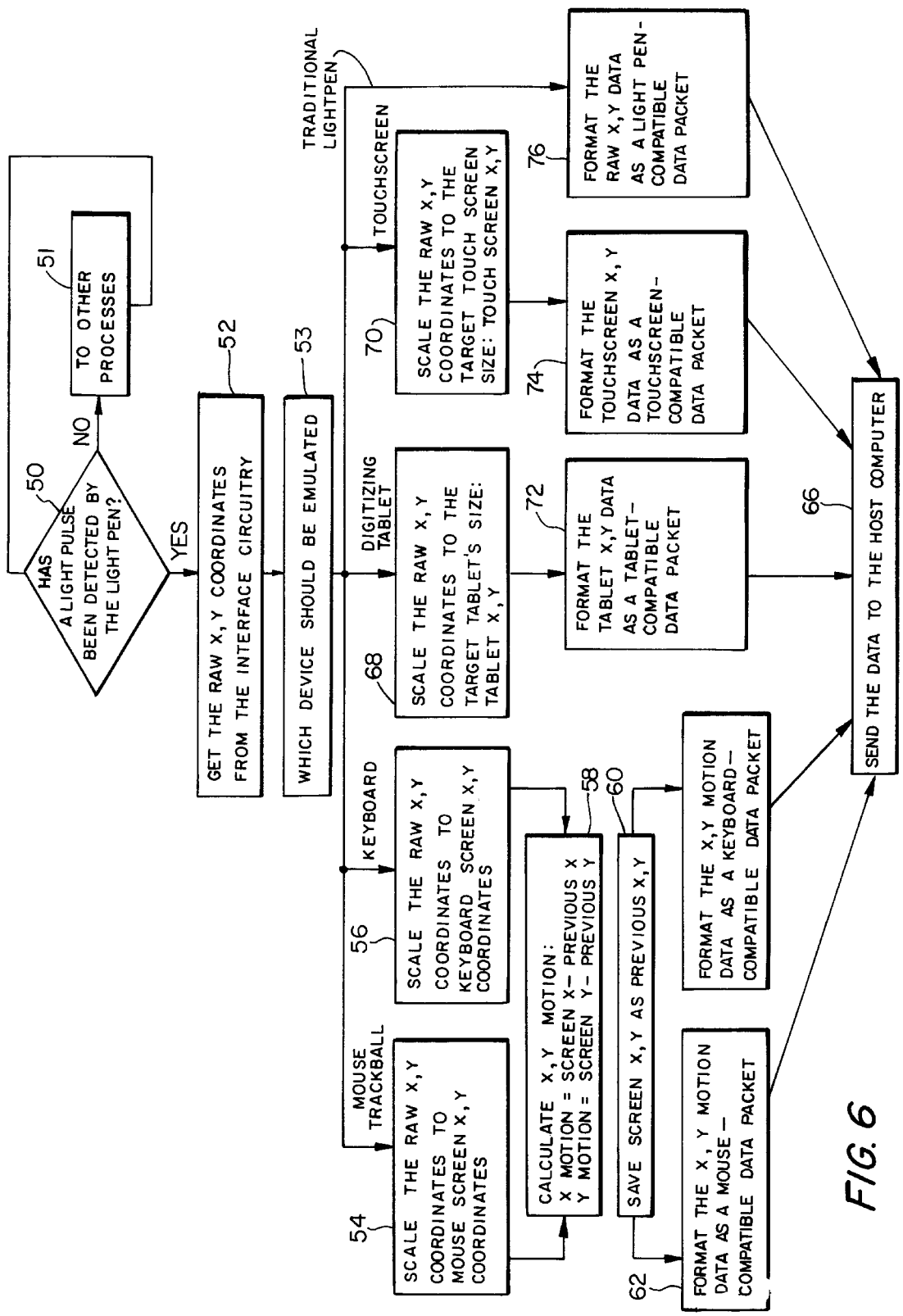
FIG. 6 is a flow chart showing the software and/or firmware utilized to provide output signals from the light pen interface system which emulate the output signals from a conventional mouse etc.

In step 50 of FIG. 6, the microcontroller determines whether or not a light pen signal has been detected. When emulating a mouse/trackball or keyboard, this step also entails coordinating the light pen position with the position of the displayed cursor, for example, by moving the light pen across the surface of the CRT until the cursor is trapped, for example, in a corner. If the answer in step 50 is no, then the step 51 directs the processing unit to continue with other processes. If the answer in Step 50 is yes, the raw x,y coordinates of the light pen are calculated by on the timing circuitry as is illustrated in step 52. The microcontroller is preprogrammed in step 54 as to which device the interface is to immulate. In steps 54 and 56, the controller scales the raw x,y coordinates to the screen coordinates which would result from the use of a mouse/trackball or keyboard. In step 58, the change of position of the light pen is calculated by subtracting the previous or immediate past position from the current position. In step 60, each current x,y position of the light pen is saved via a suitable memory in the microcontroller for use in step 58. In addition, the change of position of the light pen in the x,y coordinates is formatted into conventional mouse and keyboard compatible data packets, respectively, via steps 60 and 62 in a manner well known to those skilled in the art. The data is sent to the computer via step 66.

Steps 68 and 70 illustrate the emulation of a digitizing tablet or touchscreen. In each step, the raw x,y coordinates of the light pen are scaled to the size of the tablet or touchscreen. In steps 72 and 74, the x,y data representing the light pen position is formatted into a data packet compatible with a tablet or a touchscreen.

Step 76 illustrates the programming of the microcontroller to provide conventional light pen position data to the computer.

The following is an example of the operation in which the light pen interface system emulates a mouse.

In the example, the computer is provided with a CRT monitor having a resolution of 800 pixels in the x (horizontal) axis, and 600 pixels in the y (vertical) axis.

The light pen system will return Raw x,y values from this CRT monitor in the range of:

Minimum Raw x=260

Maximum Raw x=2500

Minimum Raw y=30

Maximum Raw y=629

A Microsoft-compatible mouse is the target device to be emulated.

Assume the light pen circuity has collected a Raw x,y coordinate pair of 1230 for x, and 155 for y, which represents the pen's current position on screen.

The flow is:

Step 54: Scale the Raw x,y coordinates to mouse screen x,y coordinates.

Scaling the Raw x,y coordinates to screen x,y coordinates is done with the following equations:

$$\text{Screen } x = (\text{Raw } x - \text{Min. Raw } x) * \left( \frac{\text{Max. Screen } x}{\text{Max. Raw } x - \text{Min. Raw } x} \right)$$

A similar procedure is used to find Screen y:

$$\text{Screen } y = (\text{Raw } y - \text{Min. Raw } y) * \left( \frac{\text{Max. Screen } y}{\text{Max. Raw } y - \text{Min. Raw } y} \right)$$

For the example values, the results are:

Screen x=(1230−260)*(800/(2500−260))=346

Screen y=(155−30)*(600/(629−30))=125

The position of the light pen, in Screen x,y, is now scaled to fit the target CRT monitor.

Step 58: Calculate x,y Motion

A mouse is a relative-position device: It tells the host computer how far it has moved, relative to it's previous position.

The lightpen is an absolute-position device: It tells the host computer it's exact x,y position.

The following accomplishes the conversion from an absolute position to a relative one:

1. x Motion=Screen x−Previous Screen x
2. y Motion=Screen y−Previous Screen y
3. Store current Screen x as new Previous Screen x
4. Store Current Screen y as new Previous Screen y For the example values, assume the Previous x,y was 8 pixels above and 6 pixels to the left of the current position. The results are:

x Motion=(346−340)=6 y Motion=(125−117)=8

Step 62: Format the x,y Motion Data as a Mouse-Compatible Data Packet.

The relative motion data contained in Motion x,y is now ready to be formatted to simulate a Mouse Data Packet:

For a Microsoft-compatible mouse, the data packet should be formatted into a sequence of 3 bytes, with the bits assigned as follows:

|  | Bit Position | | | | | | | |
| --- | --- | --- | --- | --- | --- | --- | --- | --- |
|  | D7 | D6 | D5 | D4 | D3 | D2 | D1 | D0 |
| Byte 1 = | 1 | 1 | Left Button | Right Button | Y7 | Y6 | X7 | X6 |
| Byte 2 = | 1 | 0 | X5 | X4 | X3 | X2 | X1 | X0 |
| Byte 3 = | 1 | 0 | Y5 | Y4 | Y3 | Y2 | Y1 | Y0 |

X7–X0=X Motion Data (8 bit signed binary value, Range= −128 to +127)

Y7–Y0=Y Motion Data (8 bit signed binary value, Range= −128 to +127).

For the example values, the resulting data packets would be:

|  | Bit Position | | | | | | | |
| --- | --- | --- | --- | --- | --- | --- | --- | --- |
|  | D7 | D6 | D5 | D4 | D3 | D2 | D1 | D0 |
| Byte 1 = | 1 | 1 | Left | Right | 0 | 0 | 0 | 0 |
| Byte 2 = | 1 | 0 | 0 | 0 | 0 | 1 | 1 | 0 |
| Byte 3 = | 1 | 0 | 0 | 0 | 1 | 0 | 0 | 0 |

A novel computer light pen interface system has been described. Various modifications of the disclosed circuitry, representing the preferred embodiment, will become apparent to those skilled in the art without involving any departure from the spirit and scope of the invention as defined by the appended claims.

What is claimed is:

1. In a system for providing an interface between a light pen and a computer in which a cathode ray tube ("CRT") serves as the video display, the light pen being arranged to be placed in close proximity with the CRT screen and produce output signals ("light pen signals") in response to the illumination of pixels beneath the pen, the combination comprising:

a) a sensor coil adapted to be positioned adjacent the monitor for sensing the magnetic field used to provide the CRT raster and for providing an output signal representative thereof;

b) a vertical synchronism ("sync") detection circuit coupled to the coil for providing a vertical sync signal representative of the initiation of each vertical sweep signal to the CRT;

c) a horizontal sync detection circuit coupled to the coil for providing a horizontal sync signal representative of the initiation of each horizontal sweep signal; and d) a timing circuit responsive to an output signal from the light pen and the horizontal and vertical sync signals for producing a light pen position signal representative of the position of the light pen on the CRT screen.

2. The invention of claim 1 wherein the timing circuit includes an analog ramp generator in which the output ramp voltage rises linearly from a preset initial value upon receipt of the horizontal sync signal and a sampling circuit coupled to the ramp generator for sampling the value of the ramp voltage upon the occurrence of the light pen signal, the sampled output voltage representing the time between the occurrence of a horizontal sync signal and the light pen signal.

3. The invention of claim 2 wherein the slope of the output ramp voltage produced is variable.

4. The invention of claim 3 wherein the timing circuit further includes a microcontroller which receives the light pen signal and wherein the light pen signal is in the form of a series of pulses, the microcontroller being arranged to select the appropriate middle pulse and to enable the sampling circuit to sample the ramp voltage coincident with said middle pulse.

5. The invention of claim 4 wherein the degree of slope of the ramp voltage is under the control of the microcontroller and wherein the light pen includes manually operable control means coupled to the microcontroller for setting the slope of the ramp voltage.

6. The invention of claim 2 wherein the light pen position signal is representative of the x,y coordinate position of the light pen on the CRT screen.

7. The invention of claim 2 wherein the light pen position signal is representative of the change of the x,y coordinates between successive positions of the light pen.

8. The invention of claim 1 wherein the vertical sync detection circuit includes an integrator for integrating the sensor coil output signal to provide the vertical sync signal and the horizontal sync detection circuit includes a differentiator for differentiating the sensor coil output signal to provide the horizontal sync signal.

9. The invention of claim 8 each of the vertical and horizontal sync detection circuits includes a window comparator for comparing the output signals from the integrator and the differentiator, respectively, with preset maximum and minimum values.

10. The invention of claim 5 wherein the sampling circuit is an A/D converter and wherein the sampled ramp voltage is supplied to the microcontroller by the A/D converter.

11. The invention of claim 10 wherein the timing circuit further includes a logic circuit coupled to the horizontal sync detection circuit, the microcontroller, the A/D converter, the ramp generator and the light pen, the microcontroller being arranged to provide a clear pulse signal to the logic circuit in response to the receipt of the sampled ramp voltage, the logic circuit being arranged to reset the ramp generator to its initial value upon the occurrence of the clear pulse signal and the horizontal sync signal and to control the ramp generator to hold the value of the ramp voltage in response to the sample enable signal from the microcontroller.

12. The invention of claim 2 wherein the ramp generator is controlled to hold the level of the ramp voltage constant for a preset time upon the occurrence of the light pen signal.

13. The invention of claim 12 wherein the light pen signal is in the form of a series of discrete pulses and wherein the timing circuit is arranged to select the middle pulse and to enable the sampling circuit to sample the ramp voltage coincident with said middle pulse.

14. The invention of claim 13 wherein the light pen position signal is representative of the x,y coordinate position of the light pen on the CRT screen.

15. The invention of claim 13 wherein the light pen position signal is representative of the change of the x,y coordinates between successive positions of the light pen.

16. In a system for providing an interface between a light pen and a computer in which a cathode ray tube serves as the video display, the light pen being arranged to be placed in close proximity with the CRT screen and produce light pen signals in response to the illumination of phosphorous pixels beneath the pen, the combination which comprises:

vertical and horizontal sync detection circuits for providing vertical and horizontal sync signals representative of the initiation of the vertical and horizontal sweep signals, respectively, for the CRT;

a timing circuit, including a processing unit, responsive to the light pen signals and the vertical and horizontal sync signal for processing a light pen position signal representative of a current x,y position of the light pen on the CRT screen; and the processing unit being programmed to store the current light pen position signal for subsequent use as the past light pen position signal and to subtract the past position signal from the current position signal to obtain a mouse compatible light pen position signal which is representative of the change in the x,y coordinates between the current and past positions of the light pen.

17. The invention of claim 16 wherein the processing unit is programmed to subtract the past light pen x and y position signal from the current light pen x and y position signals, respectively.

18. A method of converting a sequence of conventional light pen position signals representative of the actual x,y coordinate positions of the light pen on a CRT screen to position signals compatible with position signals provided by a mouse, to thereby cause the light pen position signals to emulate the signals provided by the mouse, the mouse functioning to move a cursor on the screen of the monitor comprising:

obtaining a light pen position signal which represents the position of the cursor;

scaling the signals representative of the actual x,y coordinates of the light pen to light pen position signals representative of the x,y coordinate position of the mouse to be emulated ("scaled light pen position signals");

storing the current scaled light pen position signal as the past light pen position signal;

obtaining a new current scaled light pen position signal which immediately follows the stored past signal; and subtracting the past light pen position signal from the new current light pen position signal to obtain a relative light pen position signal which represents the change of position of the light pen between the current and immediate past position.

* * * * *

UNITED STATES PATENT AND TRADEMARK OFFICE
CERTIFICATE OF CORRECTION

PATENT NO. : 5,877,752
DATED : March 2, 1999
INVENTOR(S) : Neil C. Puthuff and James D. Bearden It is certified that error appears in the above-indentified patent and that said Letters Patent is hereby corrected as shown below:

Column 6, line 50, "100$\Omega$" should read --100k$\Omega$--.

Signed and Sealed this

Twenty-seventh Day of July, 1999

*Attest:*

Q. TODD DICKINSON

*Attesting Officer*   *Acting Commissioner of Patents and Trademarks*